(12) United States Patent
Mehta et al.

(10) Patent No.: US 11,539,639 B2
(45) Date of Patent: Dec. 27, 2022

(54) BACNET MSTP OPTIMAL BAUD-RATE SELECTION USING AUTO BAUD FEATURE

(71) Applicant: Carrier Corporation, Palm Beach Gardens, FL (US)

(72) Inventors: Rohan Ajinkya Mehta, Madhapur (IN); Mani Teja Vaddi, Puppalaguda (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 69 days.

(21) Appl. No.: 17/131,071

(22) Filed: Dec. 22, 2020

(65) Prior Publication Data

US 2021/0352022 A1 Nov. 11, 2021

(30) Foreign Application Priority Data

May 6, 2020 (IN) .............................. 202011019287

(51) Int. Cl.
| | | |
|---|---|---|
| *H04L 47/80* | (2022.01) | |
| *H04L 43/0817* | (2022.01) | |
| *H04L 43/0894* | (2022.01) | |
| *H04L 43/12* | (2022.01) | |

(52) U.S. Cl.
CPC ........ *H04L 47/805* (2013.01); *H04L 43/0817* (2013.01); *H04L 43/0894* (2013.01); *H04L 43/12* (2013.01)

(58) Field of Classification Search
CPC ............... H04L 47/805; H04L 43/0817; H04L 43/0894; H04L 43/12
See application file for complete search history.

(56) References Cited

U.S. PATENT DOCUMENTS

| | | | |
|---|---|---|---|
| 7,986,878 B2 * | 7/2011 | Saunders | H04B 10/541 398/25 |
| 9,118,585 B2 * | 8/2015 | Lanzone | H04L 47/25 |
| 9,306,605 B1 * | 4/2016 | Van Der Tuijn | H04B 15/00 |
| 10,149,141 B1 * | 12/2018 | Stamatakis | H04L 41/0806 |

* cited by examiner

*Primary Examiner* — Chandrahas B Patel
(74) *Attorney, Agent, or Firm* — Kinney & Lange, P.A.

(57) ABSTRACT

Apparatus and associated methods relate to selection of an operating baud rate for a building automation system that communicates over a Master-Slave Token-Passing (MS/TP) BACnet. A server (or router or gateway) connected to the MS/TP BACnet is programmed to iteratively select operating baud rates from a series of available operating baud rates. Each iteration, the server broadcasts a frame indicating baud rate selection to a plurality of building automation devices connected to a MS/TP BACnet. Each of the plurality of building automation devices connected to the MS/TP BACnet then iteratively sets its baud rate so as to match the baud rate selected by the server. The server monitors communications conducted over the MS/TP BACnet so as to determine reliability or unreliability of the communications conducted over the MS/TP BACnet using the baud rates iteratively selected. A highest reliable baud rate is then used by the building automation system.

19 Claims, 5 Drawing Sheets

BACNET MSTP OPTIMAL BAUD-RATE SELECTION USING AUTO BAUD FEATURE

BACKGROUND

Building Automation and Control network (BACnet) was developed by the American Society of Heating Refrigerating, and Air-Conditioning Engineers (ASHRAE) for the purpose of providing a standard data communication protocol to permit various venders of building automation system components to communicate with each other. Such building automation system components includes Heating Ventilation and Air Conditioning (HVAC) control, fire detection and alarm, lighting control, security, "smart" elevators, utility company interface, and various other control and automation.

BACnet communications can be performed over various network protocols, such as, for example, ARCNET, Ethernet, LonTalk, Master-Slave Token-Passing (MS/TP), Point-To-Point (PTP), etc. The present application is directed to BACnet communications using MS/TP protocols. MS/TP types of communications can be performed over various physical network protocols, such as, for example, RS485, ZigBee, and LonTalk. An MS/TP network can have a series of master components and a series of slave components. Master components can initiate communication with other master and slave components, while slaves can only respond to communications directed to them. Control of a MS/TP network is passed from master to master by a token in a cyclic fashion. Each master is assigned a MAC (Media Access Control) address between 0 and 127, for example. The token is sequentially passed in ascending order and then from the master component with the highest MAC address again to the master component with the lowest MAC address.

Such communications can facilitate control an operation of these various building automation system components. A series of related building automation system components can be in communication with one another on a shared BACnet. Control or operation of these related building automation system components can be performed by a server or router or gateway connected to the shared BACnet. Control of a building environment can be controlled, for example, at a server connected to a BACnet that is also connected to various HVAC system components (or any other type of system). The server is simply one of the master components on the BACnet, and thus shares control of the BACnet communications. The server, however, can be the only device connected to the BACnet with a program configured to coordinate the system made up of the related building automation components. The server can receive data from and/or send instructions to the various HVAC system components and can control such data flow when the server has the token.

The various building automation system components can communicate over a BACnet at various baud rates, such as, for example, 9600, 14400, 19200, 38400, 57600, 76,800, 115200, etc. Every device on a shared BACnet, however, must communicate with one another using the same baud rate. Selection of baud rate at which all devices on a shared BACnet operate is not automated. An engineer must manually set the baud rate and then monitor the communications of the various building automation components connected thereto. If one of more of the connected building automation components has difficulty communicating, as indicated by flickering of communications, the engineer must lower the baud rate and again monitor the communications. The engineer must check the baud rate assigned to the building automation components experiencing difficulty communicating, so as to ensure that it is attempting to communicate at the proper baud rate. Some devices require a reboot when changing their baud rates, and so such baud rate changes can be time consuming. If, however, none of the connected building automation components has difficulty communicating, then the engineer must increase the baud rate and again monitor the communications. Such a process can be time consuming and expensive. An automated method of selecting a baud rate for a series of building automation components connected to a shared BACnet is desired.

SUMMARY

Apparatus and associated methods relate to a method for selecting an operating baud rate by a server or router or gateway connected to a Master-Slave Token-Passing (MS/TP) BACnet. The method includes the step of initiating selection of a first operating baud rate for communications over the MS/TP BACnet to an initial operating baud rate. The method includes the step of advancing, in response to the communications conducted over the MS/TP BACnet is determined to be reliable using the first operating baud rate, selection of a next operating baud rate for communications over the MS/TP BACnet. The method includes the step of repeating, in response the communications conducted over the MS/TP BACnet using the operating baud rate selected in a last iteration of the advancing step is determined to be reliable, the advancing step. The method also includes the step of terminating the method in response to communications conducted over the MS/TP BACnet is determined to be reliable using a highest reliable baud rate.

Some embodiments relate to a method for adapting to an operating baud rate by a building automation component connected to a Master-Slave Token-Passing (MS/TP) BACnet. The method includes the step of initiating selection of a first operating baud rate for communications over the MS/TP BACnet to an initial operating baud rate. The method includes the step of advancing, in response to invalidity of a cyclic redundancy check determined for the communications over the MS/TP BACnet using the initial operating baud rate for at least a threshold wait time, selection of a next operating baud rate for communications over the MS/TP BACnet. The method includes the step of repeating, in response to invalidity of a cyclic redundancy check determined for the communications over the MS/TP BACnet using the operating baud rate selected in a last iteration of the advancing step, the advancing step. The method also includes the step of terminating the method in response to validity of a cyclic redundancy check determined for the communications over the MS/TP BACnet using a valid operating baud rate.

Some embodiments relate to a system for selecting an operating baud rate by a server or router or gateway connected to a Master-Slave Token-Passing (MS/TP) BACnet. The system includes a BACnet interface configured to couple to a BACnet so as to facilitate communications to and from a plurality of building automation components connected to the BACnet. The system includes a processor. The system also includes computer readable memory having instructions that, when executed by the processor, cause the system to initiate selection of a first operating baud rate for communications over the MS/TP BACnet to an initial operating baud rate. The computer readable memory also has instructions that, when executed by the processor, cause the system to advance, in response to the communications conducted over the MS/TP BACnet is determined to be reliable using the first operating baud rate, selection of a next operating baud rate for communications over the MS/TP BACnet. The computer readable memory also has instructions that, when executed by the processor, cause the system to repeat, in response the communications conducted over the MS/TP BACnet using the operating baud rate selected in a last iteration of the advancing step is determined to be reliable, the advancing step. The computer readable memory also has instructions that, when executed by the processor, cause the system to terminate the method in response to communications conducted over the MS/TP BACnet is determined to be reliable using a highest reliable baud rate.

DETAILED DESCRIPTION

Figure 1:
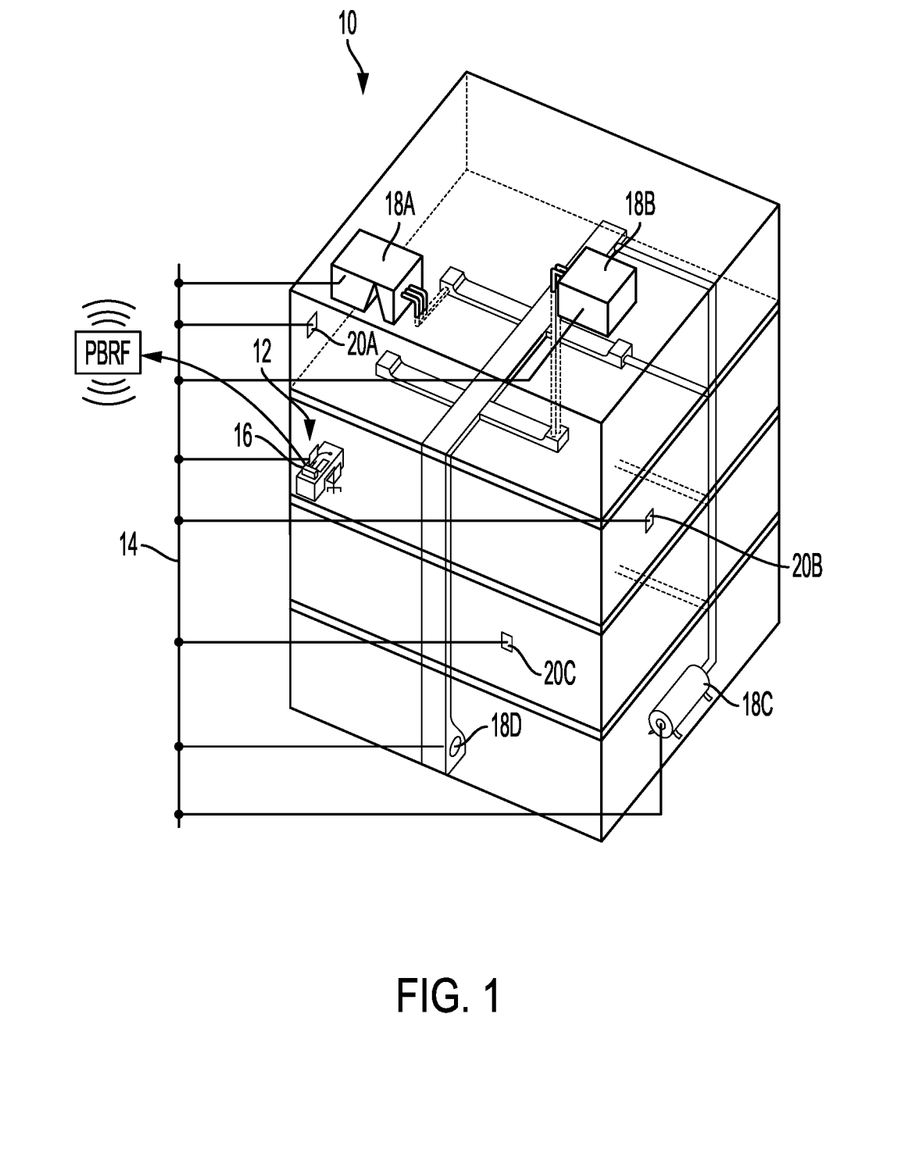
FIG. 1 is a schematic view of a building having a BACnet with various building automation components connected thereto.

Apparatus and associated methods relate to selection of an operating baud rate for a building automation system that communicates over a Master-Slave Token-Passing (MS/TP) BACnet. A server (or router or gateway) connected to the MS/TP BACnet is programmed to iteratively select operating baud rates from a series of available operating baud rates. Each iteration, the server broadcasts a frame indicating baud rate selection to a plurality of building automation devices connected to a MS/TP BACnet when the server becomes master of the network (i.e., the server has the token). Each of the plurality of building automation devices connected to the MS/TP BACnet then iteratively sets its baud rate so as to match the baud rate selected by the server. The server monitors communications conducted over the MS/TP BACnet so as to determine reliability or unreliability of the communications conducted over the MS/TP BACnet using the baud rates iteratively selected. A highest reliable baud rate is then used by the building automation system FIG. 1 is a schematic view of a building having a BACnet with various building automation components connected thereto. In FIG. 1, building 10 includes building automation system 12. Building automation system 12 includes MS/TP BACnet 14 connecting server 16 (The server must have the lowest MAC address on the network. Therefore it is typically assigned a MAC address of 1) to master devices 18A-18D (Master devices can have MAC addresses between 1 and 127.) and slave devices 20A-20C (Slave devices can have addressed between 128 and 254). Server 16 is configured to control building automation system 12 by coordinating activity amongst master devices 18A-18D and slave devices 20A-20C. All the BACnet-connected devices (i.e., server 16, master devices 18A-18D and slave devices 20A-20C) communicate with one another using the same baud rate. For example, when a device is first connected to MS/TP BACnet 14 and powered up, the device can use automatic baud rate detection to detect the baud rate of communications conducted on MS/TP BACnet 14 so as to communicate with the devices already present at the baud rate the already present devices use. Such automatic baud rate detection has been used only at startup in prior art building automation equipment.

In the FIG. 1 depiction, however, server 16 is initiating selection of an optimum baud rate for building automation system 12. Server 16, upon receiving the token giving server 16 control of BACnet 14, broadcasts, to all master devices 18A-18D and slave devices 20A-20C, a Proprietary Baud Rate Frame (PBRF), which indicates that server 16 will be changing the baud rate of communications on MS/TP BACnet 16. Each of master devices 18A-18D and slave devices 20A-20C are configured or configure themselves to automatically detect baud rate and then set the baud rate of communications to the baud rated automatically detected. Server 16 then sends a frame communicating at the baud rate selected by server 16, so as to permit the automatic detection of the baud rate selected and used to communicate by server 16. Server 16 can then perform one or more other operations, while the token is in the server's possession or server 16 can pass the token to a master device with the next highest MAC address.

After passing the token to the next master device, communications on MS/TP BACnet 14 are conducted using the baud rate selected by server 16. Server 16 monitors these subsequent communications so as to ascertain whether all master devices 18A-18D and slave devices 20A-20C can reliably communicate over MS/TP BACnet 14 at the baud rate selected by server 16. In this way, server 16 can select various baud rates and monitor communications at these selected baud rates so as to determine an optimal baud rate for building automation system 12. Various sequences of baud rates can be selected by server 16 for the purpose of determining an optimal baud rate. For example, server 16 can begin with a lowest of a series of available baud rates, and then sequentially select increasing baud rates until communications from one or more of master devices 18A-18D and slave devices 20A-20C begin flickering (i.e., the devices begin to have difficulty communicating at the selected baud rate). In another example, server 16 can begin with a nominal baud rate, and then sequence through a baud rate search pattern (e.g., doubling the baud rate if the communications are reliable at the previous baud rate, and stepping down to the next lower available baud rate if the communications are not reliable at the previous baud rate).

Figure 2:
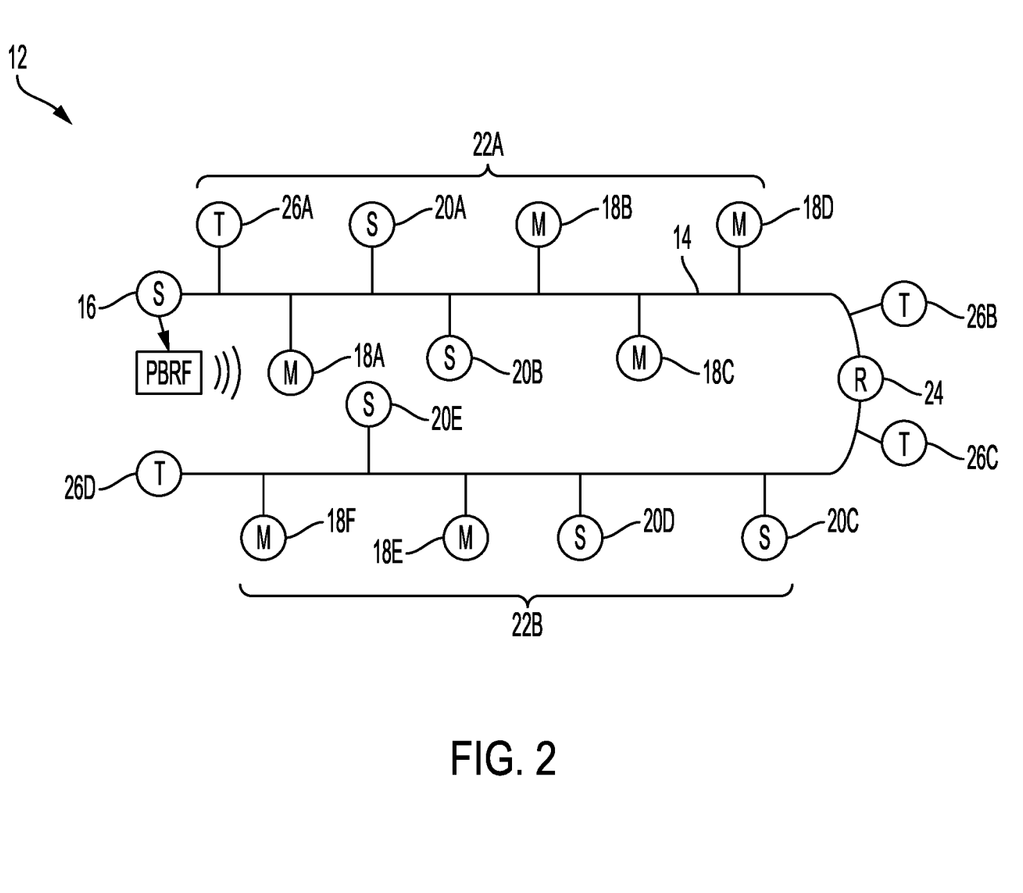
FIG. 2 is a schematic diagram of a BACnet having a server, a series of master devices and a series of slave devices.

FIG. 2 is a schematic diagram of a BACnet having a server, a series of master devices and a series of slave devices. In FIG. 2, building automation system 12 includes MS/TP BACnet 14 connecting server 16 (or router or gateway) to master devices 18A-18F and slave devices 20A-20D. BACnet 14 includes two network segments 22A and 22B connected to one another by router 24. Each network segment 22A and 22B on both of two ends by terminating resistors 26A-26D. Server 16 is depicted as initiating selection of an optimum baud rate for building automation system 12 by broadcasting a proprietary baud rate frame PBRF. This proprietary baud rate frame PBRF indicates to each the connected devices—master devices 18A-18F, slave devices 20A-20D, and repeater 24—that a new baud rate will be used for communications over MS/TP BACnet 14. PBRF is not only used during the initiation of an optimal baud rate determination but also iteratively to announce each new baud rate that server 16 will use so as to determine the optimal baud rate for communications.

Figure 3:
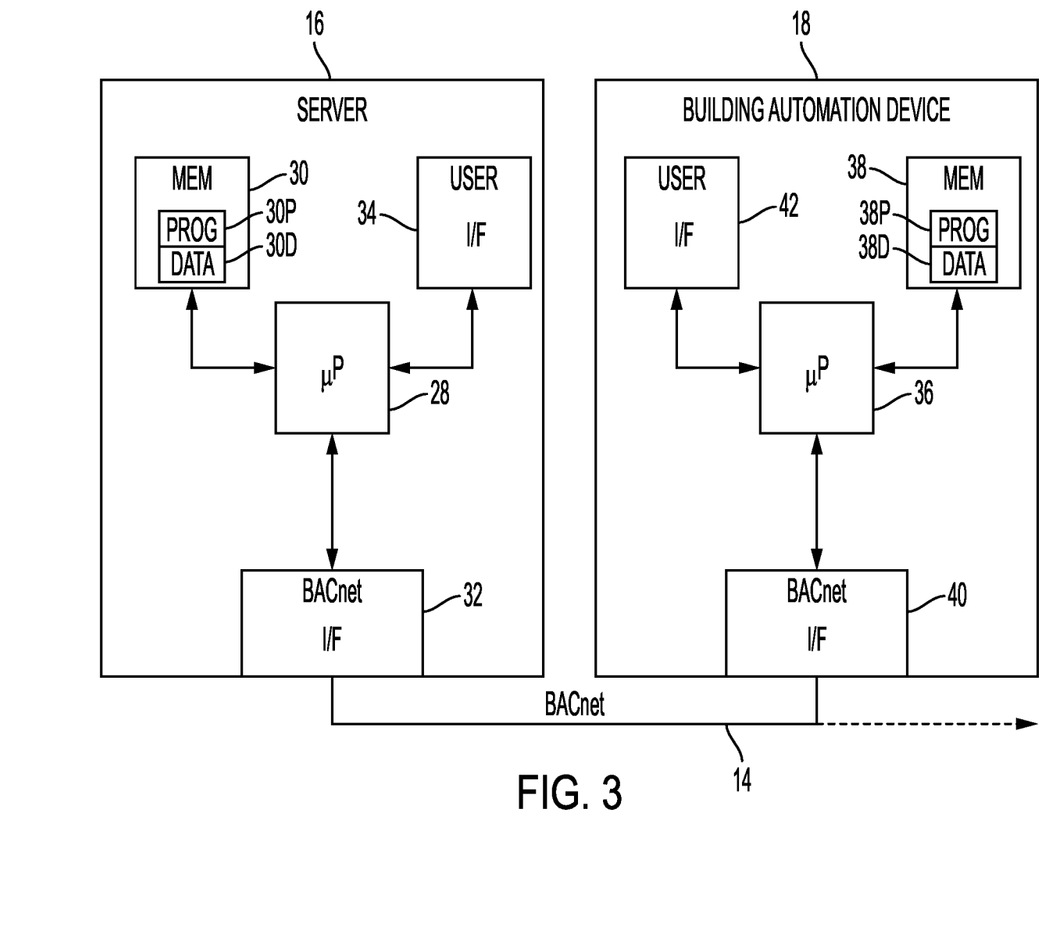
FIG. 3 is a block diagram of a partial system for selecting baud rate for a building automation system.

FIG. 3 is a block diagram of a partial system for selecting baud rate for a building automation system. In FIG. 3, building automation system 12 depicts only BACnet 14, server 16, and one of building automation components depicted in FIGS. 1 and 2—building automation component 18 (e.g., one of master devices 18A-18F, slave devices 20A-20D, and repeater 24). Server 16 includes processor 28, storage memory 30, BACnet InterFace (I/F) 32, and user Interface (I/F) 34. Storage memory 30 include program memory 30P and data memory 30D. Storage memory 30 includes a program object, which is one of standard types of BACnet objects, in which is encoded instructions corresponding to at least a server portion of a method of selecting an operating baud rate of a BACnet Master-Slave Token-Passing (MS/TP) network.

Server 16 can execute the server portion of the method for selecting an operating baud rate in response to receiving a user command to do so, for example. Server 16 can initiate selection of a first operating baud rate for communications over MS/TP BACnet 14 to an initial operating baud rate. Then server 16 can advance selection of a next operating baud rate for communications over MS/TP BACnet 14. Advancing selection of a next operating baud rate in response to the communications conducted over the MS/TP BACnet is determined to be reliable using the first operating baud rate. Server 16 can then iteratively repeat the advancing step until the communications conducted over MS/TP BACnet 14 are no longer reliable. Server 16 can repeat the advancing step in response the communications conducted over MS/TP BACnet 14 using the operating baud rate selected in a last iteration of the advancing step being determined to be reliable. Server 16 can then terminate the method in response to communications conducted over the MS/TP BACnet being determined to be reliable using a highest reliable baud rate. Each of these steps performed by server 16 using the server portion of the method will be detailed below.

For example, initiating selection of the first operating baud rate for communications over MS/TP BACnet 14 can include the following steps. In some embodiments, for example, server 16 can select, as the operating baud rate, the first operating baud rate from a series of available baud rates for communications over the MS/TP BACnet. Then, server 16 can broadcast a frame indicating baud rate selection to a plurality of building automation components connected to the MS/TP BACnet. Such a broadcast can be performed when server 16 has the token giving server 16 authority to initiated communications over MS/TP BACnet 14, for example. Server 16 can then send a communication over the BACnet using the first operating baud rate selected. This communication can be a broadcast communication, or any other type of communication directed to one or more building automation components connected to MS/TP BACnet 14. This communication can then be used by all building automation devices connected to MS/TP BACnet 14 for determining the first baud rate selected and used by server 16.

Server 16 can either continue to send frames (at least until the max frame count permitted is achieved) or pass the token to the next connected device (i.e., Poll_For_Master—the device with the next higher MAC address). All connected devices, including server 16 and building automation component 18 will conduct communications using the first baud rate selected. Server 16 can then monitor communications conducted over the MS/TP BACnet using the first operating baud rate selected. This monitoring of communications conducted over MS/TP need not necessarily be performed when server 16 has the token. Monitoring these communications that are conducted using the first baud rate selected, is done so as to determine efficacy of communicating at the first baud rate selected for the given BACnet configuration (i.e., physical length of network, number of connected devices, termination configuration, etc.). Server 16 can then determine reliability or unreliability of the communications conducted over the MS/TP BACnet using the first operating baud rate selected. Such reliability determination can be based on the communications that server 16 monitors.

If server 16 determines that reliability of communications using a lowest baud rate of the series of available baud rates is insufficient for proper operation of building automation system 12, server 16 can generate an alarm configured to alert a user of this condition. Server 16, for example, can send a signal indicative of this alarm to user interface 34 so as to alert a user to this condition. If, however, server 16 determines that reliability of communications using a lowest baud rate of the series of available baud rates is sufficient for proper operation of building automation system 12, server 16 can execute the advancement step, which will be described in more detail below.

In some embodiments, insufficiency for proper operation can be determined based on several failed communications exceeding a threshold number (e.g., 1, 2, 5, 10, etc.), for example. In other embodiments, insufficiency for proper operation can be determined based on a percentage of failed communications exceeding a threshold percentage (e.g., 1%, 3%, 6%, 10%, etc.). In some embodiments, insufficiency for proper operation can be determined based on an average time between failed communications falling below (or not exceeding) a threshold time (e.g., 100 msec, 1 sec, 10 sec, etc.). In these or other embodiments, a minimum time for monitoring communications can be required for determination of insufficiency of proper operation.

In some embodiments, sufficiency for proper operation can be determined based on several failed communications not exceeding (or falling below) a threshold number (e.g., 1, 2, 5, 10, etc), for example. In other embodiments, sufficiency for proper operation can be determined based on a percentage of failed communications not exceeding (or falling below) a threshold percentage (e.g., 1%, 3%, 6%, 10%, etc.). In some embodiments, insufficiency for proper operation can be determined based on an average time between failed communications exceeding a threshold time (e.g., 100 msec, 1 sec, 10 sec, etc.). In these or other embodiments, a minimum time for monitoring communications can be required for determination of sufficiency of proper operation. Such a minimum monitoring time can be more important in determining sufficiency of proper operation than in determining insufficiency of proper operation, because if proper operation of BACnet 14 can often be shown immediately or in a very short period of time of the baud rate selected is too high for the network configuration.

Advancing selection of the next operating baud rate for communications over MS/TP BACnet 14 can include the following steps. In some embodiments, for example, server 16 can select, as the operating baud rate, the next operating baud rate from the series of available baud rates for communications over the MS/TP BACnet. Then, server 16 can broadcast a frame indicating baud rate selection to a plurality of building automation components connected to the MS/TP BACnet. Such a broadcast can be performed when server 16 has the token giving server 16 authority to initiated communications over MS/TP BACnet 14, for example.

Server 16 can then send a communication over the BACnet using the next operating baud rate selected. This communication can be a broadcast communication, or any other type of communication directed to one or more building automation components connected to MS/TP BACnet 14. This communication can then be used by all building automation devices connected to MS/TP BACnet 14 for determining the next baud rate selected and used by server 16.

Server 16 can either continue to send frames (at least until the max frame count permitted is achieved) or pass the token to the next connected device (i.e., Poll_For_Master—the device with the next higher MAC address). All connected devices, including server 16 and building automation component 18 will conduct communications using the next baud rate selected. Server 16 can then monitor communications conducted over the MS/TP BACnet using the next operating baud rate selected. This monitoring of communications conducted over MS/TP need not necessarily be performed when server 16 has the token. Monitoring these communications that are conducted using the next baud rate selected, is done so as to determine efficacy of communicating at the next baud rate selected for the given BACnet configuration (i.e., physical length of network, number of connected devices, termination configuration, etc.). Server 16 can then determine reliability or unreliability of the communications conducted over the MS/TP BACnet using the next operating baud rate selected. Such reliability determination can be based on the communications that server 16 monitors.

The above described advancing step can be repeated until an optimal baud rate is found. If, for example, server 16 determines that reliability of communications using the second baud rate of the series of available baud rates is insufficient for proper operation of building automation system 12, server 16 can select the first operating baud rate selected, if sufficiency of proper operation was determined for communications using the first operating baud rate selected. If, however, server 16 determines that reliability of communications using the second baud rate selected of the series of available baud rates is sufficient for proper operation of building automation system 12, server 16 can select the third baud rate of the series of available baud rates. Server 16 can continue execution of the server portion of the method by iteratively selecting a next baud rate and monitoring communications using the next baud rate selected as described above.

After such iteration, server 16 can identify a maximum baud rate in which sufficiency for proper operation can be determined for all components connected to BACnet 14. Then, server 16 can continue executing the server portion of the method for selecting an operating baud rate, by selecting this maximum baud rate identified by server 16 for communication with building automation component 18 (as well as any other master and slave devices connect to BACnet 14 not depicted in FIG. 3) over BACnet 14. When server 16 receives the token, server 16 can broadcast to building automation component 18 (as well as any other master and slave devices connect to BACnet 14), a frame indicating that auto baud rate detection should be performed by all connected components, such as building automation component 18. Then, server 16 can broadcast to all connected components, or simply send one or more connected components a frame at the maximum baud rate selected. This broadcast or sent frame can be used by the connected components for the purpose of detecting the second baud rate selected by server 18. Server 16 can then end the server portion of the method.

Building automation component 18 includes processor 36, storage memory 38, BACnet InterFace (I/F) 40, and user Interface (I/F) 42. Storage memory 38 includes program memory 38P and data memory 38D. Program memory 38P includes a program object, which is one of standard types of BACnet objects, in which is encoded instructions corresponding to at least a server portion of a method of selecting an operating baud rate of a BACnet Master-Slave Token-Passing (MS/TP) network.

Building automation component 18 can execute the server portion of the method for selecting an operating baud rate in response to receiving a user command to do so, for example. Building automation component 18 can first initiate selection of a first operating baud rate for communications over the MS/TP BACnet to an initial operating baud rate. This initiating selection of the first operating baud rate can be performed in response to the frame indicative of baud rate selection broadcasted by server 16. Building automation component 18 can then advance selection of a next operating baud rate for communications over the MS/TP BACnet. Such advancing selection of the next baud rate can be performed in response to invalidity of a cyclic redundancy check determined for the communications over the MS/TP BACnet using the initial operating baud rate for at least a threshold wait time (e.g., 4-5 seconds). Building automation component 18 can then repeat the advancing step until the baud rate of communications over MS/TP BACnet is identified. For example, building automation component 18 can continue to advance selection of the next baud rate in response to continued invalidity of a cyclic redundancy check determined for the communications over the MS/TP BACnet using the operating baud rate selected in a last iteration of the advancing step. Building automation component 18 can then terminate the method in response to validity of a cyclic redundancy check determined for the communications over the MS/TP BACnet using a valid operating baud rate. Each of these steps performed by the building automation component 18 using the building automation component portion of the method will be detailed below.

For example, initiating selection of a first baud rate can include the following steps. In some embodiments, building automation component 18 can inhibit transmissions from building automation component 18 until the actual baud rate used for communications over MS/TP BACnet 14 is identified. Building automation component 18 can then select, as the operating baud rate, a first operating baud rate from a series of available baud rates for communications over the MS/TP BACnet. Building automation component 18 can then monitor communications conducted over the MS/TP BACnet using the first operating baud rate selected. Building automation component 18 can then determining validity or invalidity of the cyclic redundancy check for the monitored communications over the MS/TP BACnet using the first operating baud rate for at least a threshold wait time (e.g., 4-5 seconds. If the cyclic redundancy check is determined to be valid within the threshold wait time, for example, building automation component 18 can determine that the baud rate used to determine the cyclic redundancy check of the communication is the correct baud rate. In some embodiments a cyclic redundancy check is generated for a header of a frame, for example.

Advancing selection of the next operating baud rate can include the following steps. In some embodiments, building automation component 18 can select, as the operating baud rate, a next operating baud rate from a series of available baud rates for communications over the MS/TP BACnet. Building automation component 18 can then monitor communications conducted over the MS/TP BACnet using the next operating baud rate selected. Building automation component 18 can then determining validity or invalidity of the cyclic redundancy check for the monitored communications over the MS/TP BACnet using the next operating baud rate for at least a threshold wait time (e.g., 4-5 seconds). If the cyclic redundancy check is determined to be valid within the threshold wait time, for example, building automation component 18 can determine that the baud rate used to determine the cyclic redundancy check of the communication is the correct baud rate.

The above described advancing step can be repeated until the actual baud rate used for communications over MS/TP BACnet 14 is found. For example, building automation component 18 can then iteratively continue selecting next operating baud rates and monitoring communications conducted over BACnet 14 until a communication is detected with a header having a valid cyclic redundancy check (CRC). Then building automation component 18 can end the building automation component portion of the method, with the baud rate such that communications conducted over BACnet 14 are intelligible to building automation component 18. In some embodiments, if all of the baud rates have been attempted and building automation component 18 is still unable to find one to be intelligible, then building automation component 18 will start cycle through the baud rates again for a second iteration. This provides server 16 opportunity to stabilize its baud rate and send a Poll_For_Master frame.

Figure 4:
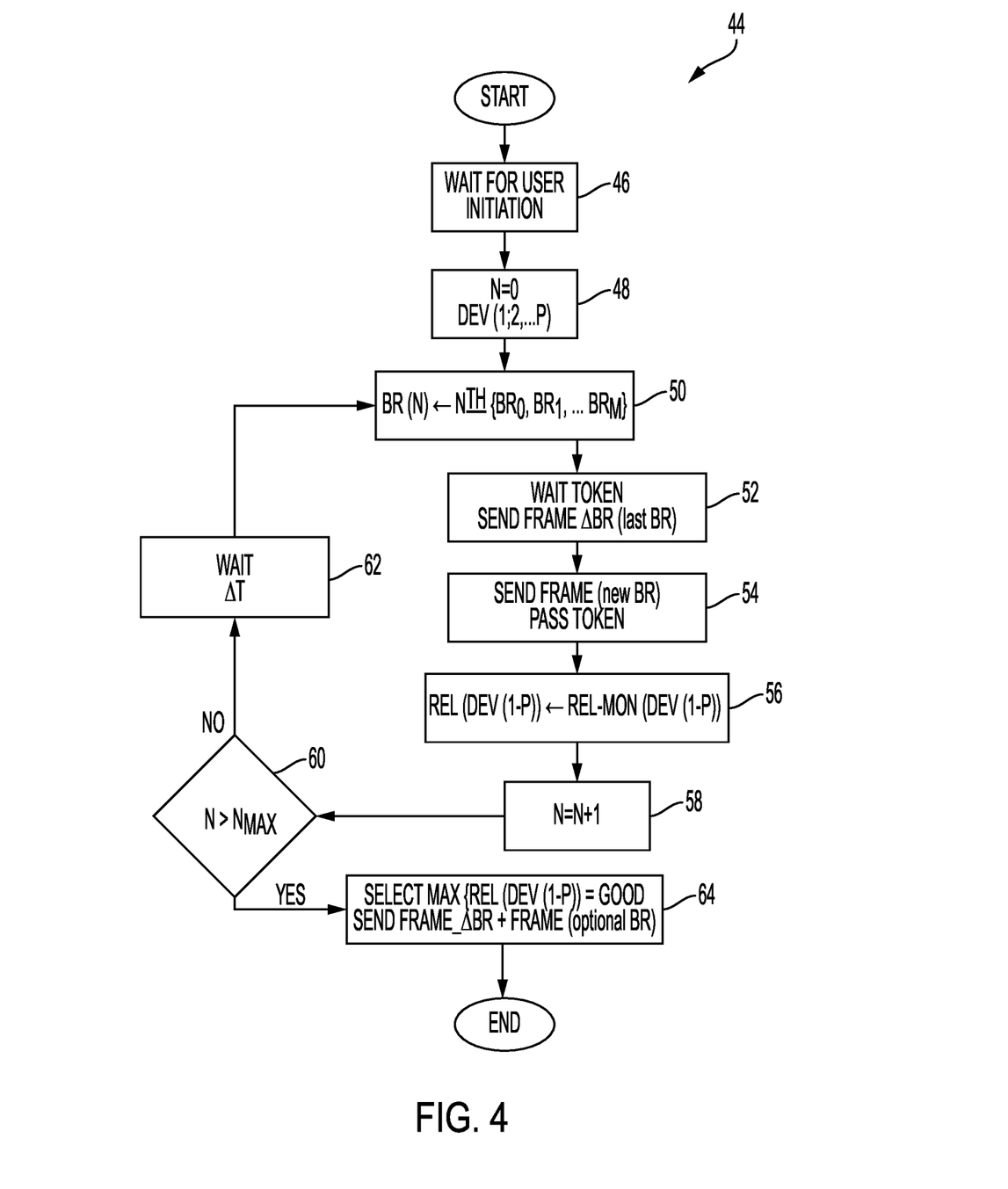
FIG. 4 is a flow chart of a server portion of a method selecting an operating baud rate by a server or router connected to a Master-Slave Token-Passing (MS/TP) BACnet.

FIG. 4 is a flow chart of a server portion of a method selecting an operating baud rate by a server (or router or gateway) connected to a Master-Slave Token-Passing (MS/TP) BACnet. In FIG. 4, method 44 is depicted from the perspective of processor 28 of server 16 shown in FIG. 3. Method 44 begins at step 46 where processor 44 waits for a user request to optimize baud rate. Such a user request can be a command issued from an input device such as a keyboard or mouse connected to user interface 34 (depicted in FIG. 3). Then, at step 48, counter N is initiated to zero and processor 28 logs all building automation devices DEV(1-P) connected to MS/TP BACnet 14. At step 50, processor 28 selects a first baud rate BR(N) from a series of available baud rates {$BR_0, BR_1, \ldots, BR_M$}. Then at step 52, processor 28 waits for the token giving server 16 authority to initiate communications over MS/TP BACnet 14. Then, still at step 52, processor 28 broadcasts a frame FRAME_ΔBR indicative of a change in baud rate to all building automation devices DEV(1-P) connected to MS/TP BACnet 14. This broadcast frame FRAME_ΔBR is sent at the baud rate previously used for communications over MS/TP BACnet 14.

At step 54, processor 28 sends a frame FRAME at the new baud rate BR(N) for the purpose of providing a communication for which building automation devices DEV(1-P) can use to identify baud rate of the communication. In some embodiments, processor 28 will send a series of such frames so as to enable building automation devices DEV(1-P) to make a series of attempts at identifying the baud rate used for such communications. In some embodiments, processor 28 will first issue a proprietary max master frame (PMMF) and/or a proprietary max info frame (PRMF) which are configured to permit the all building automation devices DEV(1-P), including server 16 to send a large number of frames without having to relinquish the token and adhering to Max_Info_Frames before passing the token. If Max_Info_Frames is configured to only one then server 16 will send the single frame and move to Poll_For_Master state where it attempts to find the next successor. This will internally send more frames which will enable building automation component 18 to identify the baud rate that server 16 has used. This can facilitate the baud rate coordination of all building automation devices DEV(1-P). After such communications, processor 28 will pass the token to the next master device connected to MS/TP BACnet 14.

At step 56, processor 28 will monitor communications over MS/TP BACnet 14 and will determine reliability REL (DEV(1 P)) of such communications. These reliabilities will be associated with the building automation devices DEV(1-P) involved in such communications. Then, at step 58, index N will be incremented. At step 60, an end condition will be evaluated. In the depicted embodiment the end condition is determined by comparing index N with a maximum index $N_{MAX}$. As described above, various other end conditions can be used. Then, at step 62, processor 28 waits until a time duration ΔT has expired before returning to step 50. The time duration ΔT can be set to permit processor 28 to monitor communications during the time duration ΔT. After returning to step 50, a new baud rate is selected for communications over MS/TP BACnet 14.

If, however, at step 60, processor 28 determines that the end condition has been met, then method 44 proceeds to step 64, where processor 28 selects an optimal baud rate by selecting the highest baud rate in which communications were reliable for all devices. Then, still at step 64, processor will broadcast a frame FRAME_ΔBR indicative of a change in baud rate to all building automation devices DEV(1-P) connected to MS/TP BACnet 14. Finally, still at step 64, processor 28 will send an additional frame or frames using the selected optimal baud rate so that building automation devices DEV(1-P) can identify the baud rate that will be used for all communications henceforth.

Figure 5:
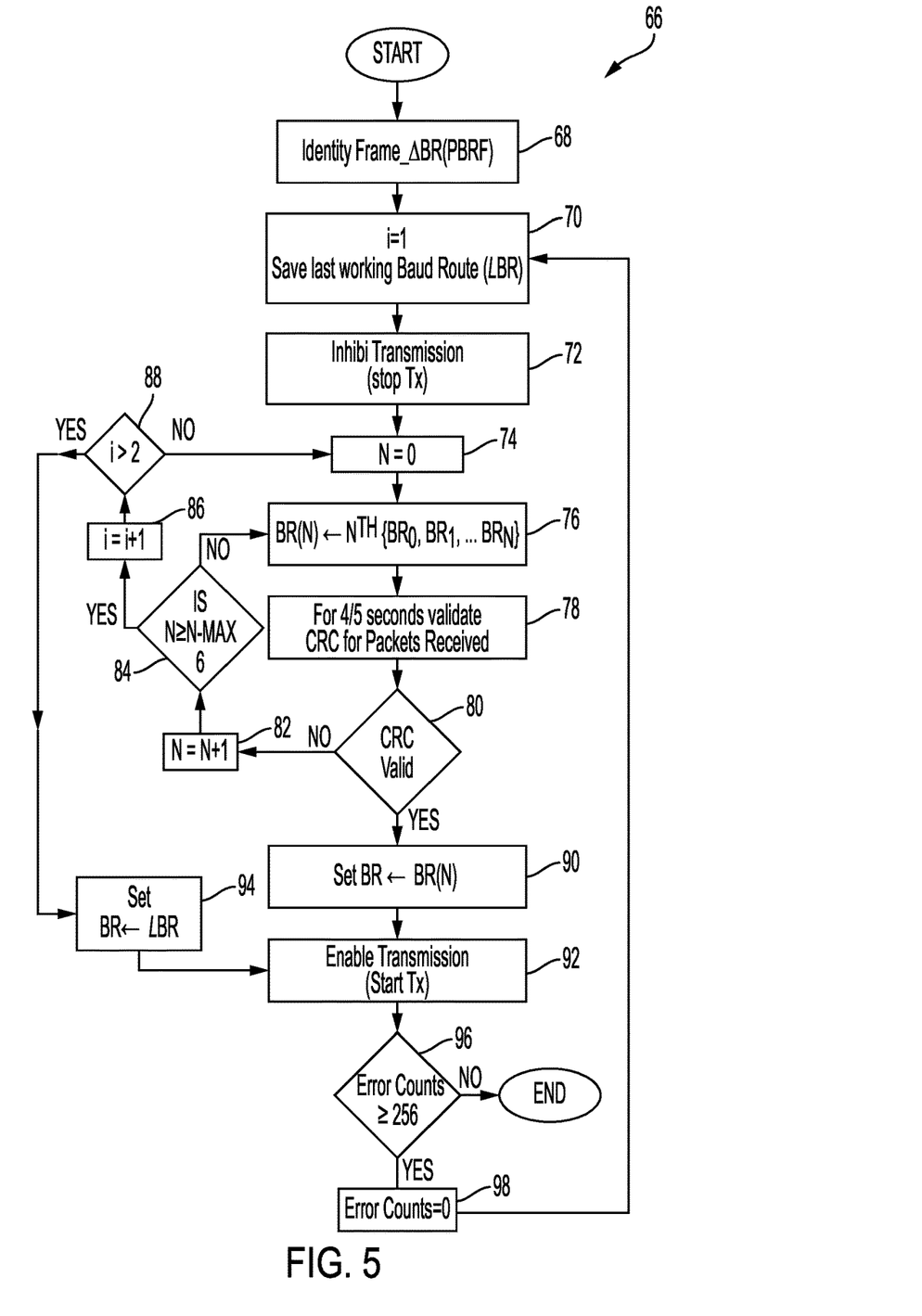
FIG. 5 is a flow chart of a building operation component method for adapting to an operating baud rate by a building automation component connected to a Master-Slave Token-Passing (MS/TP) BACnet.

FIG. 5 is a flow chart of a building operation component method for adapting to an operating baud rate by a building automation component connected to a Master-Slave Token-Passing (MS/TP) BACnet. In FIG. 4, method 66 is depicted from the perspective of processor 36 of building automation component 18 shown in FIG. 3. Method 66 begins at step 68, where processor 36 waits for a broadcast frame FRAME_ΔBR indicative of a change in baud rate to all building automation devices DEV(1-P) connected to MS/TP BACnet 14. Then, at step 70, processor 36 initialized index I to one. Also at step 70, processor 36 saves the last baud rate (LBR) that building automation component 18 successfully used for communications. Then at step 72, processor 36 inhibits transmissions. At step 74, processor 36 initialized index N to zero.

At step 76, processor 36 selects a first baud rate BR(N) from a series of available baud rates {$BR_0, BR_1, \ldots, BR_M$}. At step 78, processor 36 monitors communications over Master-Slave Token-Passing (MS/TP) BACnet 14 for a threshold wait time. Processor 36 then evaluates a cyclic redundancy check CRC for each of the communications monitored so as to determined validity of the cyclic redundancy checks CRCs. At step 80, processor 36 evaluates whether the cyclic redundancy checks CRCs are valid. If, at step 80, the cyclic redundancy checks CRCs are not valid, method 66 advances to step 82, where index N is incremented, after which method 66 continues to step 84. At step 84, processor 36 evaluates whether index N is greater than or equal to N_MAX, which indicates that all the baud rates have been attempted. If, at step 84, index N is less than N_MAX, then method 66 returns to step 76 so as to select a next baud rate BR(N) from a series of available baud rates {$BR_0, BR_1, \ldots, BR_M$}. If, however, at step 84, index N is not less than N_MAX, method 66 goes to step 86, where index I is incremented, and then proceeds to step 88, where processor 36 compares index I with a maximum number of iteration attempts to find a baud rate—in the FIG. 5 depiction, this maximum number of iteration attempts is two. If at step 88, index I is not greater than 2, method 66 returns to step 74, where processor 36 initializes index N to zero. If, however, at step 88, processor 36 determines that index I is greater than 2, then method 66 proceeds to step 94, where processor 36 sets the baud rate to the last baud rate (LBR).

If, however, back at step 80, the cyclic redundancy checks CRCs are valid, method 66 advances to step 90, where the baud rate is set to the baud rate at which the cyclic redundancy checks CRCs are valid. From both steps 90 and 94, method 66 proceeds to step 92, where processor 36 enables transmissions from building automation component 18. Then, at step 96, processor 36 evaluates the number of error counts accumulated during execution of method 36. If, at step 96, the number of errors accumulated does not exceed a predetermined error count limit (e.g., 256 as depicted in FIG. 5), then method 66 ends. If, however, at step 96, the number of error counts does exceed the predetermined error count limit, then method 66 proceeds to step 98, where processor 36 sets the number of error counts to zero, and then proceeds to step 70, to begin method 66 again.

Discussion of Possible Embodiments

The following are non-exclusive descriptions of possible embodiments of the present invention.

Apparatus and associated methods relate to a method for selecting an operating baud rate by a server or router or gateway connected to a Master-Slave Token-Passing (MS/TP) BACnet. The method includes the step of initiating selection of a first operating baud rate for communications over the MS/TP BACnet to an initial operating baud rate. The method includes the step of advancing, in response to the communications conducted over the MS/TP BACnet is determined to be reliable using the first operating baud rate, selection of a next operating baud rate for communications over the MS/TP BACnet. The method includes the step of repeating, in response the communications conducted over the MS/TP BACnet using the operating baud rate selected in a last iteration of the advancing step is determined to be reliable, the advancing step. The method also includes the step of terminating the method in response to communications conducted over the MS/TP BACnet is determined to be reliable using a highest reliable baud rate.

The method of the preceding paragraph can optionally include, additionally and/or alternatively, any one or more of the following features, configurations and/or additional components:

A further embodiment of the foregoing method, wherein the initiating step can include sending a signal indicative of a plurality of building automation components connected to the MS/TP BACnet to a user interface as determined from the monitoring step.

A further embodiment of any of the foregoing methods, wherein the initiating step can include waiting for user validation of the plurality of building automation components connected to the MS/TP BACnet to a user interface.

A further embodiment of any of the foregoing methods, wherein the initiating step can include generating a baud-rate/component matrix listing the series of available baud rates and the plurality of building automation components connected to the MS/TP BACnet and in rows and columns.

A further embodiment of any of the foregoing methods, wherein the initiating step can include indicating, in a row or column corresponding to the first operating baud rate selected, indices indicative of the reliability or unreliability of communications corresponding to each of the plurality of building automation components connected to the BACnet as monitored in the monitoring step.

A further embodiment of any of the foregoing methods, wherein the advancing step can include indicating, in a row or column corresponding to the next operating baud rate selected, indices indicative of the reliability or unreliability of communications corresponding to each of the plurality of building automation components connected to the BACnet as monitored in the monitoring step.

A further embodiment of any of the foregoing methods, wherein the terminating step can include sending a signal indicative of baud-rate/component matrix to a user interface.

A further embodiment of any of the foregoing methods, wherein the initiating step can include selecting, as the operating baud rate, the first operating baud rate from a series of available baud rates for communications over the MS/TP BACnet. The initiating step can further include broadcasting a frame indicating baud rate selection to a plurality of building automation components connected to the MS/TP BACnet. The initiating step can further include sending a communication over the BACnet using the first operating baud rate selected. The initiating step can further include monitoring communications conducted over the MS/TP BACnet using the first operating baud rate selected. The initiating step can further include determining reliability or unreliability of the communications conducted over the MS/TP BACnet using the first operating baud rate selected.

A further embodiment of any of the foregoing methods, wherein the first operating baud rate is a lowest baud rate of the series of available baud rates for communications over the MS/TP BACnet. The initiating step can further include generating an alarm if the communications conducted over the MS/TP BACnet using the lowest baud rate is determined to be unreliable.

A further embodiment of any of the foregoing methods, wherein the advancing step can include selecting, as the operating baud rate, the first operating baud rate from a series of available baud rates for communications over the MS/TP BACnet. The initiating step can further include broadcasting a frame indicating baud rate selection to a plurality of building automation components connected to the MS/TP BACnet. The initiating step can further include sending a communication over the BACnet using the first operating baud rate selected. The initiating step can further include monitoring communications conducted over the MS/TP BACnet using the first operating baud rate selected. The initiating step can further include determining reliability or unreliability of the communications conducted over the MS/TP BACnet using the first operating baud rate selected.

A further embodiment of any of the foregoing methods, wherein the next operating baud rate is a next higher baud rate of the series of available baud rates for communications over the MS/TP BACnet.

A further embodiment of any of the foregoing methods, wherein the terminating step can include broadcasting a frame indicating baud rate selection to a plurality of building automation components connected to the MS/TP BACnet. The terminating step can further include sending a communication over the BACnet using the highest reliable baud rate.

Some embodiments relate to a method for adapting to an operating baud rate by a building automation component connected to a Master-Slave Token-Passing (MS/TP) BACnet. The method includes the step of initiating selection of a first operating baud rate for communications over the MS/TP BACnet to an initial operating baud rate. The method includes the step of advancing, in response to invalidity of a cyclic redundancy check determined for the communications over the MS/TP BACnet using the initial operating baud rate for at least a threshold wait time, selection of a next operating baud rate for communications over the MS/TP BACnet. The method includes the step of repeating, in response to invalidity of a cyclic redundancy check determined for the communications over the MS/TP BACnet using the operating baud rate selected in a last iteration of the advancing step, the advancing step. The method also includes the step of terminating the method in response to validity of a cyclic redundancy check determined for the communications over the MS/TP BACnet using a valid operating baud rate.

The method of the preceding paragraph can optionally include, additionally and/or alternatively, any one or more of the following features, configurations and/or additional components:

A further embodiment of the foregoing method, wherein the initiating step can include the step of selecting, as the operating baud rate, a first operating baud rate from a series of available baud rates for communications over the MS/TP BACnet. The initiating step can further include monitoring communications conducted over the MS/TP BACnet using the first operating baud rate selected. The initiating step can further include determining validity or invalidity of the cyclic redundancy check for the monitored communications over the MS/TP BACnet using the first operating baud rate.

A further embodiment of any of the foregoing methods, wherein the first operating baud rate is a lowest baud rate of the series of available baud rates for communications over the MS/TP BACnet.

A further embodiment of any of the foregoing methods, wherein the terminating step can include the step of broadcasting a frame indicating baud rate selection to a plurality of building automation components connected to the MS/TP BACnet. The terminating step can further include the step of sending a communication over the BACnet using the highest reliable baud rate.

A further embodiment of any of the foregoing methods, wherein the advancing step can include the step of incrementing the operating baud rate to a next baud rate of a series of available baud rates. The advancing step can further include the step of monitoring communications conducted over the MS/TP BACnet using the next operating baud rate selected. The advancing step can further include the step of determining validity or invalidity of the cyclic redundancy check for the monitored communications over the MS/TP BACnet using the next operating baud rate.

A further embodiment of any of the foregoing methods, wherein the next operating baud rate is a next highest baud rate of the series of available baud rates for communications over the MS/TP BACnet.

Some embodiments relate to a system for selecting an operating baud rate by a server or router or gateway connected to a Master-Slave Token-Passing (MS/TP) BACnet. The system includes a BACnet interface configured to couple to a BACnet so as to facilitate communications to and from a plurality of building automation components connected to the BACnet. The system includes a processor. The system also includes computer readable memory having instructions that, when executed by the processor, cause the system to initiate selection of a first operating baud rate for communications over the MS/TP BACnet to an initial operating baud rate. The computer readable memory also has instructions that, when executed by the processor, cause the system to advance, in response to the communications conducted over the MS/TP BACnet is determined to be reliable using the first operating baud rate, selection of a next operating baud rate for communications over the MS/TP BACnet. The computer readable memory also has instructions that, when executed by the processor, cause the system to repeat, in response the communications conducted over the MS/TP BACnet using the operating baud rate selected in a last iteration of the advancing step is determined to be reliable, the advancing step. The computer readable memory also has instructions that, when executed by the processor, cause the system to terminate the method in response to communications conducted over the MS/TP BACnet is determined to be reliable using a highest reliable baud rate.

The system of the preceding paragraph can optionally include, additionally and/or alternatively, any one or more of the following features, configurations and/or additional components:

A further embodiment of the foregoing system, wherein the computer readable memory can have further instructions that, when executed by the processor causing the system to initiate selection of the first operating baud rate, cause the system to select, as the operating baud rate, the first operating baud rate from a series of available baud rates for communications over the MS/TP BACnet. The computer readable memory also can have instructions that, when executed by the processor, cause the system to broadcast a frame indicating baud rate selection to a plurality of building automation components connected to the MS/TP BACnet. The computer readable memory also can have instructions that, when executed by the processor, cause the system to send a communication over the BACnet using the first operating baud rate selected. The computer readable memory also can have instructions that, when executed by the processor, cause the system to monitor communications conducted over the MS/TP BACnet using the first operating baud rate selected. The computer readable memory also can have instructions that, when executed by the processor, cause the system to determine reliability or unreliability of the communications conducted over the MS/TP BACnet using the first operating baud rate selected.

A further embodiment of any of the foregoing systems, wherein the computer readable memory can have further instructions that, when executed by the processor causing the system to advance selection of the next operating baud rate, cause the system to select a next operating baud rate from a series of available baud rates for communications over the MS/TP BACnet. The computer readable memory also can have instructions that, when executed by the processor, cause the system to broadcast a frame indicating baud rate selection to a plurality of building automation components connected to the MS/TP BACnet. The computer readable memory also can have instructions that, when executed by the processor, cause the system to send a communication over the BACnet using the next operating baud rate selected. The computer readable memory also can have instructions that, when executed by the processor, cause the system to monitor, via the server or router, communications conducted over the MS/TP BACnet using the next operating baud rate selected. The computer readable memory also can have instructions that, when executed by the processor, cause the system to determine reliability or unreliability of the communications conducted over the MS/TP BACnet using the next operating baud rate selected.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for selecting an operating baud rate by a server or router or gateway connected to a Master-Slave Token-Passing (MS/TP) BACnet, the method comprising the steps of:
   initiating selection of a first operating baud rate for communications over the MS/TP BACnet to an initial operating baud rate;
   advancing, in response to the communications conducted over the MS/TP BACnet is determined to be reliable using the first operating baud rate, selection of a next operating baud rate for communications over the MS/TP BACnet;
   repeating, in response to the communications conducted over the MS/TP BACnet using the operating baud rate selected in a last iteration of the advancing step determined to be reliable, the advancing step; and
   terminating the method in response to communications conducted over the MS/TP BACnet is determined to be reliable using a highest reliable baud rate,
   wherein the terminating step comprises:
      broadcasting a frame indicating baud rate selection to a plurality of building automation components connected to the MS/TP BACnet; and
      sending a communication over the BACnet using the highest reliable baud rate.

2. The method of claim 1, wherein the initiating step comprises:
   sending a signal indicative of a plurality of building automation components connected to the MS/TP BACnet to a user interface as determined from the monitoring step.

3. The method of claim 2, wherein the initiating step further comprises:
   waiting for user validation of the plurality of building automation components connected to the MS/TP BACnet to a user interface.

4. The method of claim 2, wherein the initiating step further comprises:
   generating a baud-rate/component matrix listing the series of available baud rates and the plurality of building automation components connected to the MS/TP BACnet and in rows and columns.

5. The method of claim 4, wherein the initiating step further comprises:
   indicating, in a row or column corresponding to the first operating baud rate selected, indices indicative of the reliability or unreliability of communications corresponding to each of the plurality of building automation components connected to the BACnet as monitored in the monitoring step.

6. The method of claim 5, wherein the advancing step comprises:
   indicating, in a row or column corresponding to the next operating baud rate selected, indices indicative of the reliability or unreliability of communications corresponding to each of the plurality of building automation components connected to the BACnet as monitored in the monitoring step.

7. The method of claim 6, wherein the terminating step comprises:
   sending a signal indicative of baud-rate/component matrix to a user interface.

8. The method of claim 1, wherein the initiating step comprises:
   selecting, as the operating baud rate, the first operating baud rate from a series of available baud rates for communications over the MS/TP BACnet;
   monitoring communications conducted over the MS/TP BACnet using the first operating baud rate selected; and
   determining reliability or unreliability of the communications conducted over the MS/TP BACnet using the first operating baud rate selected.

9. The method of claim 8, wherein the first operating baud rate is a lowest baud rate of the series of available baud rates for communications over the MS/TP BACnet, the initiating step further comprising:
   generating an alarm if the communications conducted over the MS/TP BACnet using the lowest baud rate is determined to be unreliable.

10. The method of claim 1, wherein the advancing step comprises:
    selecting a next operating baud rate from a series of available baud rates for communications over the MS/TP BACnet;
    monitoring, via the server or router or gateway, communications conducted over the MS/TP BACnet using the next operating baud rate selected; and
    determining reliability or unreliability of the communications conducted over the MS/TP BACnet using the next operating baud rate selected.

11. The method of claim 10, wherein the next operating baud rate is a next higher baud rate of the series of available baud rates for communications over the MS/TP BACnet.

12. A system for selecting an operating baud rate by a server or router or gateway connected to a Master-Slave Token-Passing (MS/TP) BACnet, the system comprising:
    a BACnet interface configured to couple to a BACnet so as to facilitate communications to and from a plurality of building automation components connected to the BACnet;
    a processor; and
    computer readable memory having instructions that, when executed by the processor, cause the system to:
       initiate selection of a first operating baud rate for communications over the MS/TP BACnet to an initial operating baud rate;
       advance, in response to the communications conducted over the MS/TP BACnet is determined to be reliable using the first operating baud rate, selection of a next operating baud rate for communications over the MS/TP BACnet;
       repeat, in response to the communications conducted over the MS/TP BACnet using the operating baud rate selected in a last iteration of the advancing step is determined to be reliable, the advancing step; and
       terminate selection of the operating baud rate in response to communications conducted over the MS/TP BACnet is determined to be reliable using a highest reliable baud rate, wherein terminating selection of the operating baud rate includes:

broadcasting a frame indicating baud rate selection to a plurality of building automation components connected to the MS/TP BACnet; and sending a communication over the BACnet using the highest reliable baud rate.

13. The system of claim 12, wherein the computer readable memory has further instructions that, when executed by the processor causing the system to initiate selection of the first operating baud rate, cause the system to:

select, as the operating baud rate, the first operating baud rate from a series of available baud rates for communications over the MS/TP BACnet;

monitor communications conducted over the MS/TP BACnet using the first operating baud rate selected; and determine reliability or unreliability of the communications conducted over the MS/TP BACnet using the first operating baud rate selected.

14. The system of claim 12, wherein the computer readable memory has further instructions that, when executed by the processor causing the system to advance selection of the next operating baud rate, cause the system to:

select a next operating baud rate from a series of available baud rates for communications over the MS/TP BACnet;

monitor, via the server or router, communications conducted over the MS/TP BACnet using the next operating baud rate selected; and determine reliability or unreliability of the communications conducted over the MS/TP BACnet using the next operating baud rate selected.

15. A method for adapting to an operating baud rate by a building automation component connected to a Master-Slave Token-Passing (MS/TP) BACnet, the method comprising the steps of:

initiating selection of a first operating baud rate for communications over the MS/TP BACnet to an initial operating baud rate;

advancing, in response to invalidity of a cyclic redundancy check determined for the communications over the MS/TP BACnet using the initial operating baud rate for at least a threshold wait time, selection of a next operating baud rate for communications over the MS/TP BACnet;

repeating, in response to invalidity of a cyclic redundancy check determined for the communications over the MS/TP BACnet using the operating baud rate selected in a last iteration of the advancing step, the advancing step; and terminating the method in response to validity of a cyclic redundancy check determined for the communications over the MS/TP BACnet using a valid operating baud rate.

16. The method of claim 15, wherein the advancing step comprises:

incrementing the operating baud rate to a next baud rate of a series of available baud rates monitoring communications conducted over the MS/TP BACnet using the next operating baud rate selected; and determining validity or invalidity of the cyclic redundancy check for the monitored communications over the MS/TP BACnet using the next operating baud rate.

17. The method of claim 16, wherein the next operating baud rate is a next highest baud rate of the series of available baud rates for communications over the MS/TP BACnet.

18. The method of claim 15, wherein the initiating step comprises:

selecting, as the operating baud rate, a first operating baud rate from a series of available baud rates for communications over the MS/TP BACnet;

monitoring communications conducted over the MS/TP BACnet using the first operating baud rate selected; and determining validity or invalidity of the cyclic redundancy check for the monitored communications over the MS/TP BACnet using the first operating baud rate.

19. The method of claim 18, wherein the first operating baud rate is a lowest baud rate of the series of available baud rates for communications over the MS/TP BACnet.

* * * * *